United States Patent
Sasaki et al.

(10) Patent No.: US 6,393,171 B2
(45) Date of Patent: May 21, 2002

(54) OPTICAL MODULE FOR OPTICAL TRANSMISSION AND MANUFACTURING PROCESS THEREFOR

(75) Inventors: Junichi Sasaki; Masataka Itoh; Naoki Kitamura, all of Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/885,518

(22) Filed: Jun. 20, 2001

Related U.S. Application Data

(63) Continuation of application No. 09/081,322, filed on May 19, 1998, now abandoned.

(30) Foreign Application Priority Data

May 19, 1997 (JP) .............................................. 9-128399

(51) Int. Cl.⁷ ................................................. G02B 6/12
(52) U.S. Cl. .......................................... 385/14; 438/31
(58) Field of Search ........................... 385/14, 2, 8, 49, 385/147; 438/31, 25, 27, 59, 63, 65, 71, 72, 116

(56) References Cited

U.S. PATENT DOCUMENTS

| | | | |
|---|---|---|---|
| 4,892,374 A | 1/1990 | Ackerman et al. | 385/49 |
| 5,780,875 A | 7/1998 | Tsuji et al. | 257/81 |
| 5,907,646 A | 5/1999 | Kitamura | 385/14 |
| 5,999,269 A | 12/1999 | Haugsjaa et al. | 356/401 |
| 6,009,218 A | 12/1999 | Grand et al. | 385/14 |
| 6,023,339 A | 2/2000 | Haugsjaa et al. | 356/401 |
| 6,274,391 B1 * | 8/2001 | Wachtler et al. | 438/116 |
| 6,316,281 B1 * | 11/2001 | Lee et al. | 385/14 |
| 6,324,314 B1 * | 11/2001 | Ukechi et al. | 385/14 |

FOREIGN PATENT DOCUMENTS

JP          8-179514          7/1996

* cited by examiner

Primary Examiner—Akm E. Ullah
(74) Attorney, Agent, or Firm—Dickstein Shapiro Morin & Oshinsky LLP

(57) ABSTRACT

The integrity of a solder jointing pad, which is used to mount an optical module, is enhanced by avoiding exposure to high temperatures used in the formation of an accompanying optical wave guide. The enhanced integrity of the solder jointing pad permits a mounting solder bump to be evenly distributed on the pad, which improves mounting position characteristics. The solder jointing pads are elongated in shape and arranged in parallel and perpendicular orientation with respect to an optical transmission path in the optical module. The enhanced integrity of the solder jointing pads permits a precise amount of solder to be introduced to the pads when mounting the optical module. The optical module can then be precisely positioned simply by varying the amount of solder introduced to the solder jointing pads. The optical device can be positioned with high accuracy by taking advantage of the self-alignment action which occurs between the molten solder bumps and the solder jointing pads. The optical module can thus be precisely positioned during manufacturing, without the need for additional adjustments.

15 Claims, 5 Drawing Sheets

OPTICAL MODULE FOR OPTICAL TRANSMISSION AND MANUFACTURING PROCESS THEREFOR

CROSS-REFERENCE TO RELATED APPLICATIONS

This is a continuation of U.S. patent application Ser. No. 09/081,322, filed May 19, 1998, now abandoned, in the name of Junichi Sasaki et al. and entitled "OPTICAL MODULE FOR OPTICAL TRANSMISSION AND MANUFACTURING PROCESS THEREFOR."

BACKGROUND OF THE INVENTION

The present invention relates to an optical module in which optical devices, such as light emitting device and a light receiving device, are integrated with an optical transmission path, such as obtained with fiber optics and optical waveguides, and a process for manufacturing the same.

In an optical module used in optical communication, the optical devices and the optical transmission path included in the module must be closely positioned. Close positioning of the devices assures that an optical signal is accurately transmitted between the optical devices and the optical transmission path.

Japanese Patent Application Laid-Open No. 8-179154 discloses a process for manufacturing such an optical module at a low cost. The disclosed process permits optical devices to be mounted in self-alignment by utilizing the surface tension of a solder bump. In this process, as a first step, a metallized solder joint pad is formed on a silicon substrate with photolithography technology. In the next step, silicon is deposited on the substrate, and patterned to form a planar optical waveguide. Then, formed on the solder joint pad on the substrate is a solder bump on which a semiconductor laser chip formed with a solder joint pad is mounted. Subsequently, the solder bump is made molten so that the semiconductor laser chip is joined to the silicon substrate. The semiconductor laser chip is automatically positioned at a predetermined junction position by a self-alignment effect based on the surface tension of the molten solder bump.

In the process, the optical waveguide and the solder joint pad must be formed using a continuous photolithography process to accurately establish a relative position of the optical waveguide and the solder joint pad formed on the silicon substrate. To this end, the optical waveguide is formed at a high temperature of 800° C. or more by a silicon deposition process after the solder joint pad is formed on the substrate. However, if the metallized solder joint pad is exposed to a high temperature during formation of the optical waveguide, it deteriorates and is difficult to join to the solder joint pad. In addition, since the solder joint pad is of a minute size, and directly formed on the silicon substrate, it tends to easily peel off the substrate when subjected to a high temperature. Therefore, positioning the semiconductor laser chip by self-alignment using the solder bump is difficult to attain accurately.

SUMMARY OF THE INVENTION

An object of the present invention is to eliminate the above problem, and to provide an optical module which can be accurately and reliably manufactured at a low cost, and to provide a manufacturing process for the same.

The optical module of the present invention comprises a substrate with an optical waveguide, and an optical device located opposite to a section of the optical waveguide, wherein the optical device is secured by a solder bump on a solder joint pad. The solder joint pad is formed on non-solder jointing metallization on the substrate. The optical device has a solder joint pad for joining the solder bump. The solder joint pads on the substrate and the optical device are preferably a plurality of elongated pads, including pads parallel to the optical waveguide with their longitudinal side, and pads perpendicular to the optical waveguide with their longitudinal side, respectively.

The process for manufacturing the optical module of the present invention comprises the steps of forming non-solder jointing metallization on a substrate, forming an optical waveguide on the substrate formed with the non-solder jointing metallization, removing a part of the optical waveguide, forming a solder joint pad on the non-solder jointing metallization, and installing an optical device on the solder joint pad through a solder bump.

According to the present invention, since the solder joint pad on the substrate is formed on the non-solder jointing metallization after the optical waveguide is formed, and is not subject to a high temperature, the solder laser chip is accurately positioned by the self-alignment effect of the solder bump on the solder joint pad.

BRIEF DESCRIPTION OF THE DRAWINGS

The above and other objects, features and advantages of the present invention will become apparent from the following detailed description when taken with the accompanying drawings in which.

DETAILED DESCRIPTION OF EMBODIMENTS OF THE INVENTION

Figure 1A:
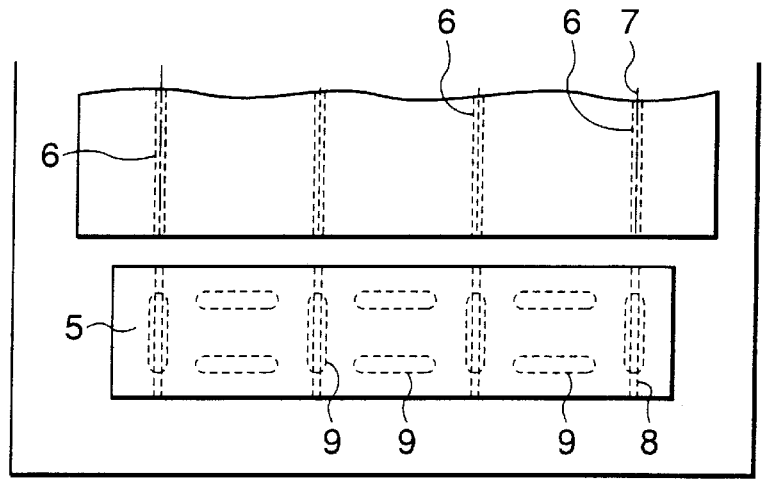
FIG. 1A through 1C are a plan view, a front view and a sectional view of a conventional optical module respectively.
Figure 1B:
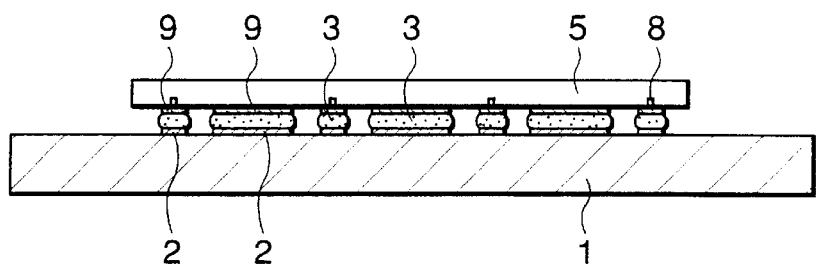
Figure 1C:
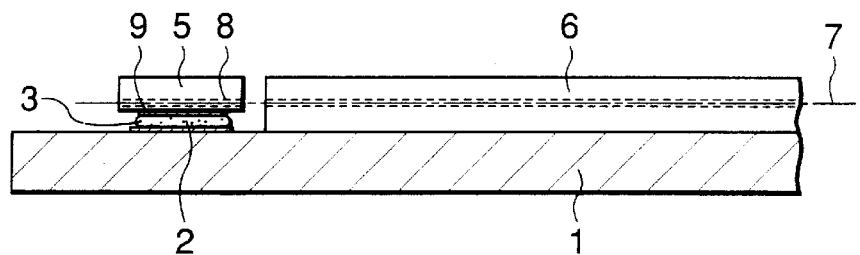

A conventional optical module is shown in FIGS. 1A through 1C. As shown in these figures, a plurality of solder joint pads 2 are formed on a silicon substrate 1 in such a manner that they are longitudinally orthogonal to the silicon substrate 1. Formed on these solder joint pads 2 are solder bumps 3 on each of which a solder joint pad 9 for a semiconductor laser chip 5 is mounted. An optical waveguide 6 is formed on the other side of the silicon substrate 1 through deposition of silicon. As shown in these figures, an active layer 8 of the semiconductor laser chip 5 is formed to be linear with the optical axis 7 of the optical waveguide 6. In the optical module with such arrangement, when the optical waveguide 6 is formed, the solder joint pad 2 already formed on the silicon substrate 1 is subject to a high temperature, which causes solder joint pad 2 to deteriorate. This makes it difficult to accurately position the semiconductor laser chip based on the self-alignment effect achieved with the solder bump.

Figure 2A:
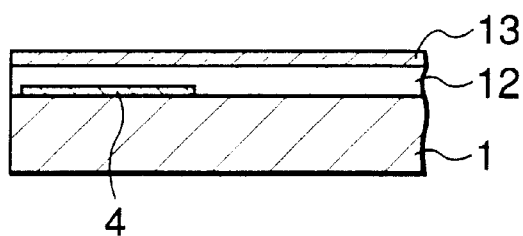
FIGS. 2A through 2E are side views showing formation of the optical module of the present invention up to the step of forming a solder joint pad on a substrate according to a manufacturing process of the present invention.

Referring now to FIGS. 2A–2E, a series of schematic views show the optical module according to the present invention in various stages of the manufacturing process. in FIG. 2A, a WSi layer 4 is first formed and patterned as non-solder joining metallization on the silicon substrate 1. Then, a lower clad layer 12 and a core layer 13 of the optical waveguide consisting of quartz are sequentially deposited on the surface of the silicon substrate 1, and form a part of the optical waveguide through photolithography and etching.

Figure 2B:
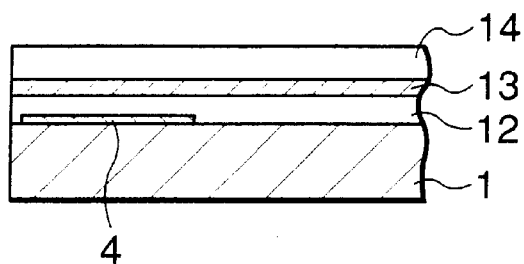
Figure 2C:
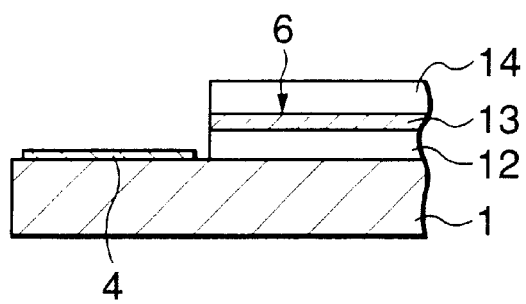
Figure 2D:
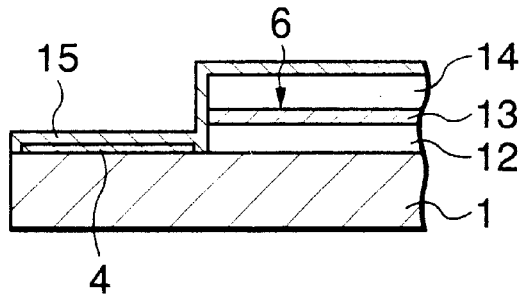
Figure 2E:
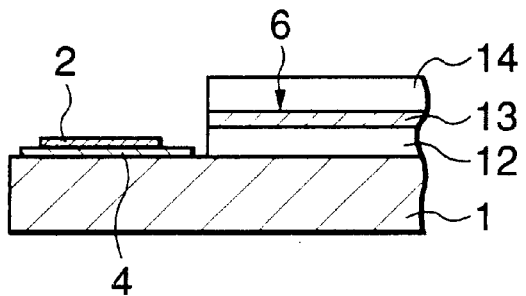

Subsequently, as shown in FIG. 2B, an upper clad layer 14 is deposited on the entire surface. In the following step, as shown in FIG. 2C, the deposited layers 12, 13 and 14 are etched and removed from an area where the semiconductor laser chip is to be mounted, to expose an end surface of the optical waveguide. In the following step D, as shown in FIG. 2D, a metal layer 15 is formed on the entire surface. Then, a part of the metal layer 15 is patterned through photolithography and etching, and formed on the WSi layer 4 as a solder joint pad 2 on the substrate. A plurality of solder joint pads 2 are formed. Each of the solder joint pads 2 is formed in an elongated shape. A number of the solder joint pads 2 are formed longitudinally parallel to the optical waveguide 6, while others are formed longitudinally perpendicular to the optical waveguide 6. Photoresist is sprayed on the silicon substrate for patterning the metal layer 15 using photolithography. In addition, a stepper exposure system is employed to permit photolithography to be performed on a substrate with a step. The optical waveguide 6 positioned relative to the solder joint pad 2 on the substrate through a matching mask photoprocess.

Figure 3A:
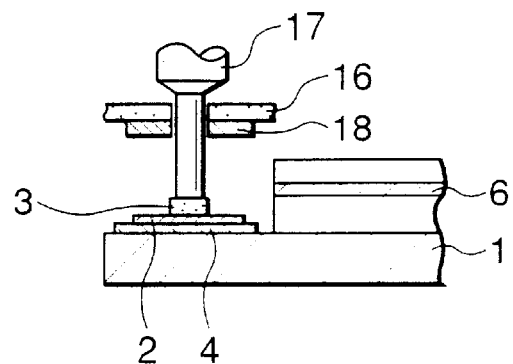
FIGS. 3A through 3E are side views showing formation of the optical module of the present invention up to the step of introducing a semiconductor laser chip on the solder joint pad according to a manufacturing process of the present invention.
Figure 3B:
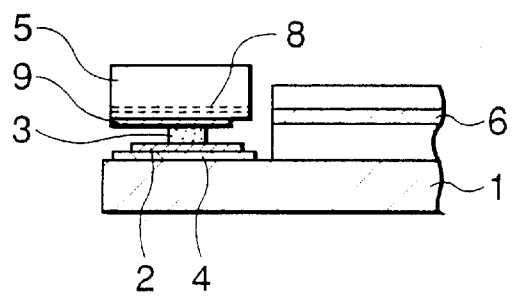
Figure 3C:
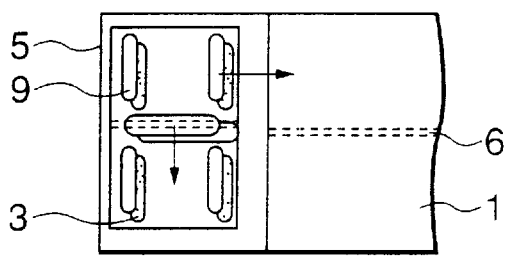
Figure 3D:
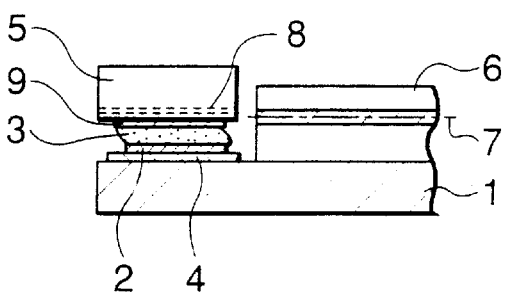
Figure 3E:
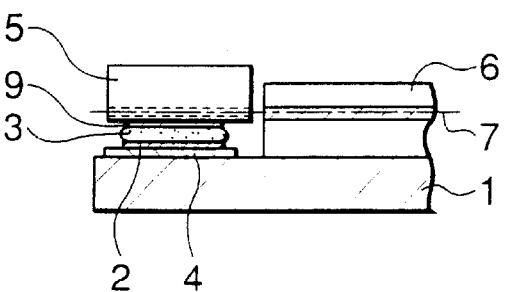

Then, as shown in FIGS. 3A through 3E, the semiconductor laser chip 5 is formed on the solder joint pad 2 on the substrate. FIG. 3A shows the step of forming a solder bump 3 consisting of AuSn on the solder joint pad 2. In this step, an AuSn sheet 16 is stamped by a miniature punch 17 and die 18. The stamped AuSn piece is thermally compressed on the solder joint pad 2 on the substrate as it is. At the stage where the solder bump 3 is formed, an oxide film on the surface of the solder bump 3 can be molten and removed by adding flux. Then, as shown in FIG. 3B, a plurality of solder joint pads 9 on the optical device and the semiconductor laser chip 5 are mounted on the solder bumps 3 which correspond to the solder joint pads 2, the semiconductor laser chip 5 being previously formed with an active layer 8 for emitting light. Thereafter, when the silicon substrate 1 is heated in a nitrogen atmosphere, the solder bump 3 is molten. The molten solder bump 3 spreads over the entire surfaces of both solder joint pads 2 and 9 on the substrate and optical devices. As shown in FIGS. 3C and 3D, the molten solder places both solder joint pads 2 and 9 at predetermined positions by the self-alignment action due to its surface tension. As show in FIGS. 3E, this action accurately positions the semiconductor laser chip 5 at a predetermined location on the silicon substrate 1.

Here, since the WSi layer does not have wettability, the solder bump 3 wets and spreads only over the solder joint pad 2. In addition, since the solder joint pads 2 and 9 are elongated, the molten solder bump exerts a self-alignment action in a direction perpendicular to the longitudinal direction of the pad. Therefore, since here a plurality of pads 2 and 9 are longitudinally oriented parallel and perpendicular to the optical waveguide 6, the self-alignment effect of the solder bump acts in a parallel and perpendicular direction to the optical waveguide 6. Consequently, the relative plane position between the active layer 8 of the semiconductor laser chip 5 and the optical waveguide 6 is established in a desired positional relationship. In addition, the semiconductor laser chip 5 is positionable at a height which depends on the volume of solder used to form the solder bump 3. If the volume of the solder bump 3 is controlled to a predetermined value, active layer 8 of the semiconductor laser chip 5 can be aligned with the optical axis 7 of the optical waveguide 6. The light emitted from the semiconductor laser chip 5 can then be incident on the optical waveguide 6. Since the solder joint pad 2 is formed after the optical waveguide 6 is formed on the silicon substrate 1, the solder joint pad 2 is not subjected to high temperatures which would cause the solder joint pad 2 to deteriorate. The later formation of the solder pad 2 permits the optical waveguide 6 to be formed with a high temperature process of 800° C. or more, as with a quartz type optical waveguide. Therefore, it becomes possible to form a pad with stable quality, on which a solder bump 3 can be reliably formed. In addition, the piece of solder is stamped out from the solder sheet with a miniature punch 17 and die 18 is secured on the solder joint pad 2. Unlike vapor deposition or plating, forming the AuSn alloy solder bump from a stamped sheet allows the solder bump 3 to be formed in a proper amorphous composition rapidly and at low cost.

Since the solder joint pad 2 on the substrate is formed on the non-solder jointing WSi film 4, it can be formed with higher adhesion that in a case where it is directly formed on silicon. WSi is a material which can sufficiently withstand the high temperature necessary for forming the waveguide. Since the WSi film 4 is provided in a step previous to the step of forming the waveguide 6, patterning can be easily performed. In the above process, the solder bump 3 is remolten in a nitrogen atmosphere, thereby preventing oxidation of the solder bump 3. An inert gas such as argon can also be similarly used to prevent oxidation. In addition, hydrogen gas can be used to reduce oxide films on the solder bump 3, so that the molten solder can well wet and spread over the solder joint pad 2 on the optical device, to enhance joint properties and the self-alignment effect on the optical device. In addition, when Au or Pt is used as the material for the respective solder joint pads 2 and 9 on the substrate and optical device, an oxide film will not form as easily on the surface of the pad. Thus, the solder bump 3 can well wet and spread over the solder joint pad 2 to provide a desirable self-alignment action.

Figure 4A:
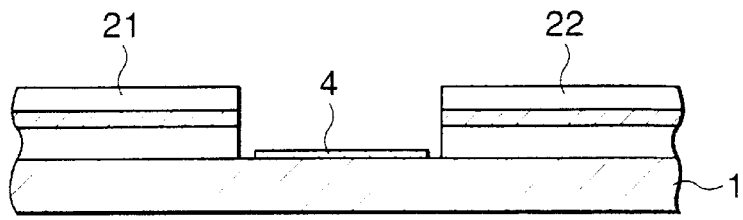
FIGS. 4A through 4C are side views showing the process for manufacturing an optical module with another arrangement.
Figure 4B:
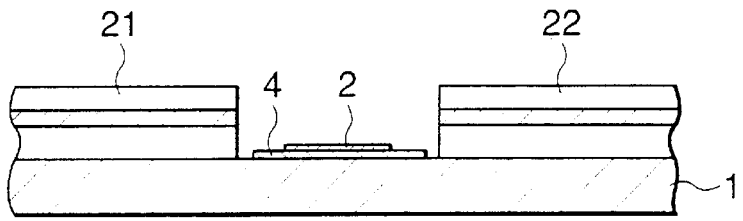
Figure 4C:
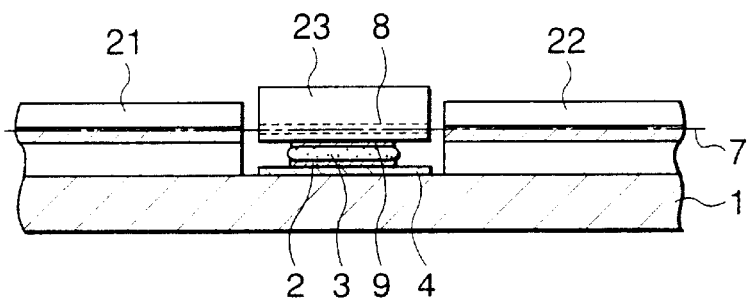

FIGS. 4A through 4C show an example of an alternate manufacturing process according to the present invention. FIG. 4A shows an arrangement in which a middle section of the optical waveguide 6 is etched, and the WSi layer 4 is formed on the etched section. This arrangement is achieved by the process described above to form a first optical waveguide 21 and a second optical waveguide 22. Then, as shown in FIG. 4B, a plurality of the solder joint pads 2 are formed on the WSi layer 4 to have an elongated shape. The longitudinal axes are arranged to be parallel and perpendicular to the respective first and second optical waveguides 21 and 22. Subsequently, as shown in FIG. 4C, a semiconductor optical amplifier device 23 is mounted on the solder joint pad 2 on the substrate using the self-alignment effect of the solder bump 3 which avoids the need to adjust the optical axis. That is, the active layer 8 of the semiconductor optical amplifier device 23 aligns with the optical axis 7 of the first an second optical waveguides 21 and 22. The resultant optical amplifier module permits the optical amplifier device 23 to amplify light propagated over the first optical waveguide 21, and to project the light on the second waveguide 22.

Figure 5A:
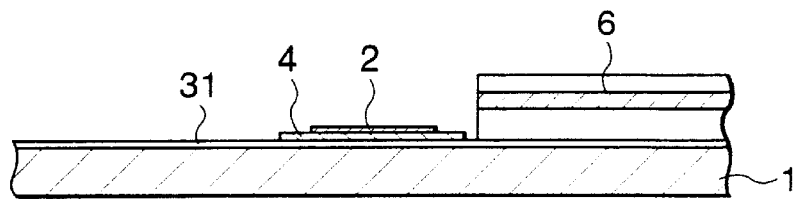
FIGS. 5A through 5E are side views showing the process for manufacturing an optical module with still another arrangement.
Figure 5B:
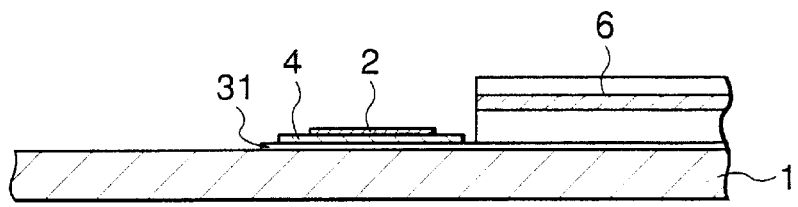
Figure 5C:
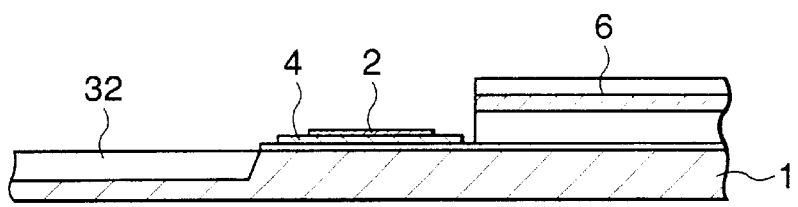
Figure 5D:
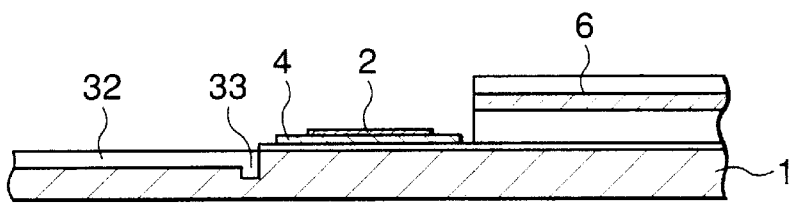
Figure 5E:
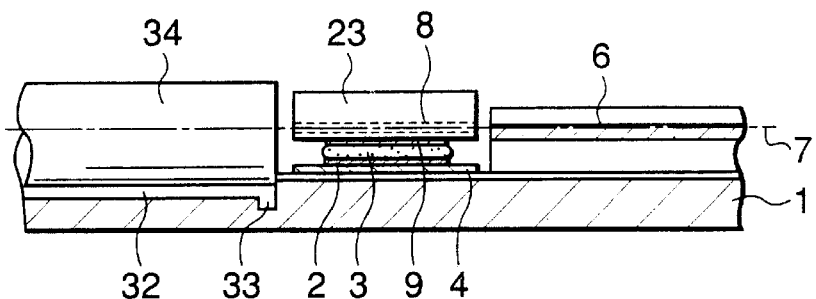

FIGS. 5A through 5E show a manufacturing process for an optical amplifier module in which light propagated over an optical waveguide is amplified by an optical amplifier device, and projected onto an optical fiber. First, as in FIG. 5A, the WSi layer 4, the optical waveguide 6 consisting of quartz and the solder joint pad 2 are formed on the silicon substrate 1 along with the oxide film 31. Then, as shown in FIG. 5B, the oxide film 31 is etched and removed to expose silicon at a region on which the fiber optics 34 is mounted in a subsequent step. Subsequently, as shown in FIG. 5C, etching is performed on a surface region of the silicon substrate 1 to form a V-groove 32. Moreover, as shown in FIG. 5D, the surface of the silicon substrate 1 is cut at an end of the V-groove 32 to form a slit 33 for positioning the end plane of the optical fiber. Finally, as shown in FIG. 5E, the solder bump 3 is formed on the solder joint pad 2, on which the semiconductor optical amplifier device 23 is mounted using the solder joint pad 9. Then, the solder bump 3 is made molten, and the semiconductor optical amplifier device 23 is joined to the silicon substrate 1 in self-alignment through the solder bump 3, which avoids the need to adjust the optical axis. Then, the optical fiber 34 is positioned by the V-groove 32 and the slit 33, and secured on the silicon substrate 1 with adhesives. Once positioned as described, the active layer 8 of the semiconductor optical amplifier device 23, and the optical axis 7 of the optical waveguide 6 and the optical fiber are all aligned. The resulting optical amplifier module permits the optical amplifier device 23 to amplify light propagated over the optical waveguide 6 and to project the light onto the optical fiber 34.

The above embodiment contemplates use of the semiconductor leaser chip 5 and the semiconductor optical amplifier device 23 as the optical device, but another optical device such as a waveguide type light receiving device or a semiconductor optical modulator device may be used. The solder bump is indicated as made of AuSn, but may be implemented by other solder materials such as AuSi or AuGe. In addition, another material may be used in place of WSi as long as it a material with good adhesion with the substrate and the solder joint pad, and with no solder wettability. Moreover, an optical divider, optical switch or the like may be used in place of the optical waveguide 6. Alternatively, the optical device and the optical waveguide 6 are not limited to a single core structure, but a multi-core optical device or optical waveguide may be used. In addition, according to the present invention, a spot-size converter may be provided in the optical input/output section of the optical device. Usually, when an optical device such as a semiconductor laser is coupled to an optical waveguide, a coupling loss in mode fields is experienced. Use of the spot-size converter helps reduce such losses, whereby highly efficient coupling can be attained. Conversely, even when the spot-size converter section is not provided on the optical device, a lens may be provided on the end of the optical fiber or optical waveguide. Use of a lens also reduces differences experienced in mode fields, so that highly efficient coupling can be attained. In addition, when the optical fiber is secured by adhesives, it may have a groove or hole to provide the adhesives with an escape path in the middle section of the V-groove.

In addition, in the above example, the films of the solder joint pad formed on the substrate are constituted in an order of titanium-platinum-gold from the silicon substrate. Furthermore, the solder joint pad has a rounded contour in dimensions of 140 $\mu$m long and 25 $\mu$m wide, with a thickness of 0.7 $\mu$m. The bump height after joining is 18 $\mu$m including the thickness of both solder joint pads on the substrate and the optical device. The heating temperature is 300° C. for reflow of the joint. In forming the solder bump, the AuSn sheet solder has a thickness of 20 $\mu$m, the punch has a diameter of 60 $\mu$m, and stamping is performed with the AuSn sheet solder heated to 180° C., and the silicon substrate heated to 150° C. The optical waveguide has a lower clad layer 19 $\mu$m thick, a core layer 6 $\mu$m thick, an upper clad layer of 20 $\mu$m, a size of 6 $\mu$m×6 $\mu$m, and a height of 22 $\mu$m from the silicon substrate surface to the center of the optical waveguide. When an optical fiber is used, the fiber has a diameter of 125 $\mu$m, the mode field has a diameter of 9.5 $\mu$m, the V-groove has a width of 122 $\mu$m and a depth of 50 $\mu$m or more, and the oxide film which becomes the mask layer when forming the V-groove by etching has a thickness of 0.5 $\mu$m or more.

As described above, according to the optical module and its manufacturing process, the solder joint pad is formed after the optical waveguide is formed on the substrate, and it thus becomes possible to form a stable solder joint pad. In addition, adhesion of the solder joint pad is enhanced by providing the solder joint pad on the non-solder jointing metallization, whereby reliable bump mounting can be attained. Therefore, it becomes possible to construct a reliable and low cost optical module which does not require adjustment of an optical axis due to the self-alignment effect of the solder bump.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical module for optical transmission comprising:
    a substrate;
    at least one optical waveguide formed on the substrate and having an end surface;
    at least two spaced apart non-solder jointing metallization layers formed on the substrate and spaced from the end surface of the one optical waveguide;
    a solder joint pad formed on each of the non-solder jointing metallization layers;
    a solder bump provided in a predetermined amount on each of the solder joint pads; and
    at least one optical device located on the solder bumps and spaced from the end surface of the one optical waveguide, whereby the one optical device is secured to the solder joint pads upon heating said substrate.

2. The optical module as set forth in claim 1, wherein one another solder joint pad is provided on each of the solder bumps under the one optical device, each of the solder joint pads being elongated, in combination, the solder pads forming a pattern of elongated solder pads including solder pads parallel to the optical waveguide with their longitudinal side and those perpendicular to the optical waveguide with their longitudinal side respectively.

3. The optical module as set forth in claim 1, wherein the one non-solder jointing metallization layer is formed by WSi.

4. The optical module as set forth in claim 1, wherein said solder joint pads contains either one of Au or Pt.

5. The optical module as set forth in claim 1, wherein the solder bump is AuSn alloy.

6. A process for manufacturing an optical module comprising:

forming non-solder jointing metallization on a substrate;

forming an optical waveguide on the substrate after said non-solder jointing metallization is formed;

removing a portion of said optical waveguide;

forming a solder joint pad on said non-solder jointing metallization; and installing an optical device on said solder joint pad through a solder bump.

7. The process for manufacturing an optical module as set forth in claim 6, wherein the step of removing a part of the optical waveguide comprises the step of forming an end surface of the optical waveguide by removing a part of the optical waveguide, thereby having the non-solder jointing metallization spaced from the one optical waveguide.

8. The process for manufacturing an optical module as set forth in claim 7, wherein the solder joint pad formed on the non-solder jointing metallization is formed at a location opposite to the end surface of the optical waveguide.

9. The process for manufacturing an optical module as set forth in claim 6, further comprising the step of forming a solder joint pad on an optical device.

10. The process for manufacturing an optical module as set forth in claim 6, wherein the step of installing an optical device on the solder joint pad through a solder bump comprises the steps of jointing a solder piece on the solder joint pad through thermocompression bonding, placing the optical device so that the solder joint pad of the optical device is positioned on said solder piece, and melting said solder bump.

11. The process for manufacturing an optical module as set forth in claim 10, wherein, in the thermocompression step, a solder alloy sheet is stamped out by a punch and die, the solder piece being on the solder joint pad of the substrate as it is.

12. The process for manufacturing an optical module as set forth in claim 10, wherein melting of the solder bump is performed in one or more gasses selected from nitrogen, hydrogen, and inert gas.

13. The process for manufacturing an optical module as set forth in claim 6, further comprising the steps of forming a groove in the substrate, and installing fiber optics in said groove.

14. The process for manufacturing an optical module as set forth in claim 13, further comprising the steps of forming an oxide film on the substrate, and removing the oxide film on a region on the substrate where the groove is formed.

15. An optical module for optical transmission comprising:

a substrate;

an optical waveguide formed on the substrate and extending along a first axis;

a non-solder metallization layer formed on the substrate and spaced from the optical waveguide;

at least one solder joint pad formed on the non-solder metallization layer;

a solder bump formed in a predetermined amount on the one solder joint pad; and an optical device formed on the solder bump and extending along a second axis, the optical device being spaced from the optical waveguide and being attached to the one solder joint pad after the solder bump melts in a position wherein the first and second axes are aligned.

* * * * *